(12) United States Patent
Griffin

(10) Patent No.: US 8,283,594 B2
(45) Date of Patent: Oct. 9, 2012

(54) SYSTEM AND METHOD FOR SUPPLYING FLUIDS TO A PLASMA ARC TORCH

(75) Inventor: David C. Griffin, Florence, SC (US)

(73) Assignee: The ESAB Group, Inc., Florence, SC (US)

( * ) Notice: Subject to any disclaimer, the term of this patent is extended or adjusted under 35 U.S.C. 154(b) by 170 days.

(21) Appl. No.: 12/911,400

(22) Filed: Oct. 25, 2010

(65) Prior Publication Data

US 2012/0031882 A1 Feb. 9, 2012

Related U.S. Application Data

(63) Continuation-in-part of application No. 12/852,772, filed on Aug. 9, 2010.

(51) Int. Cl.
*B23K 10/00* (2006.01)
(52) U.S. Cl. ......... 219/121.48; 219/121.51; 219/121.55; 219/121.54
(58) Field of Classification Search ............. 219/121.51, 219/121.55, 121.54, 121.39, 121.57, 75, 219/121.48
See application file for complete search history.

(56) References Cited

U.S. PATENT DOCUMENTS

| | | | |
|---|---|---|---|
| 3,242,305 A | 3/1966 | Kane et al. | |
| 4,389,559 A | 6/1983 | Rotolico et al. | |
| 4,788,408 A | 11/1988 | Wlodarczyk et al. | |
| 5,017,752 A | 5/1991 | Severance, Jr. et al. | |
| 5,396,043 A | 3/1995 | Couch, Jr. et al. | |
| 5,409,164 A | 4/1995 | Delzenne et al. | |
| 5,796,067 A | 8/1998 | Enyedy et al. | |
| 5,801,355 A * | 9/1998 | Saio et al. | 219/121.44 |
| 5,856,647 A | 1/1999 | Luo | |
| 5,859,403 A | 1/1999 | Zigliotto | |
| 5,938,949 A | 8/1999 | Enyedy et al. | |
| 6,084,199 A | 7/2000 | Lindsay et al. | |

(Continued)

FOREIGN PATENT DOCUMENTS

EP   0 591 018 A1   4/1994

(Continued)

OTHER PUBLICATIONS

International Search Report and Written Opinion for Application No. PCT/US2011/057500 dated Mar. 29, 2012.

(Continued)

*Primary Examiner* — Mark Paschall

(57) ABSTRACT

A system for supplying fluids to a plasma arc torch includes a single-gas power supply for regulating supply of electrical power to the plasma arc torch and for regulating supply of a first fluid to the plasma arc torch, a flow regulator for regulating supply of a second fluid to the plasma arc torch, and a first pressure-actuated valve disposed between the flow regulator and the plasma arc torch. The pressure-actuated valve shuts off supply of the second fluid to the torch when the first pressure-actuated valve is closed and allows the second fluid to be supplied to the torch when the first pressure-actuated valve is open. The first pressure-actuated valve is structured and arranged to be opened by pressure of the first fluid being supplied to the torch and to be closed when the first fluid is not being supplied to the torch. The system can also include a second pressure-actuated valve in the supply line for the first fluid, which is opened by pressure of the second fluid being supplied to the torch.

5 Claims, 3 Drawing Sheets

U.S. PATENT DOCUMENTS

Figure 1:
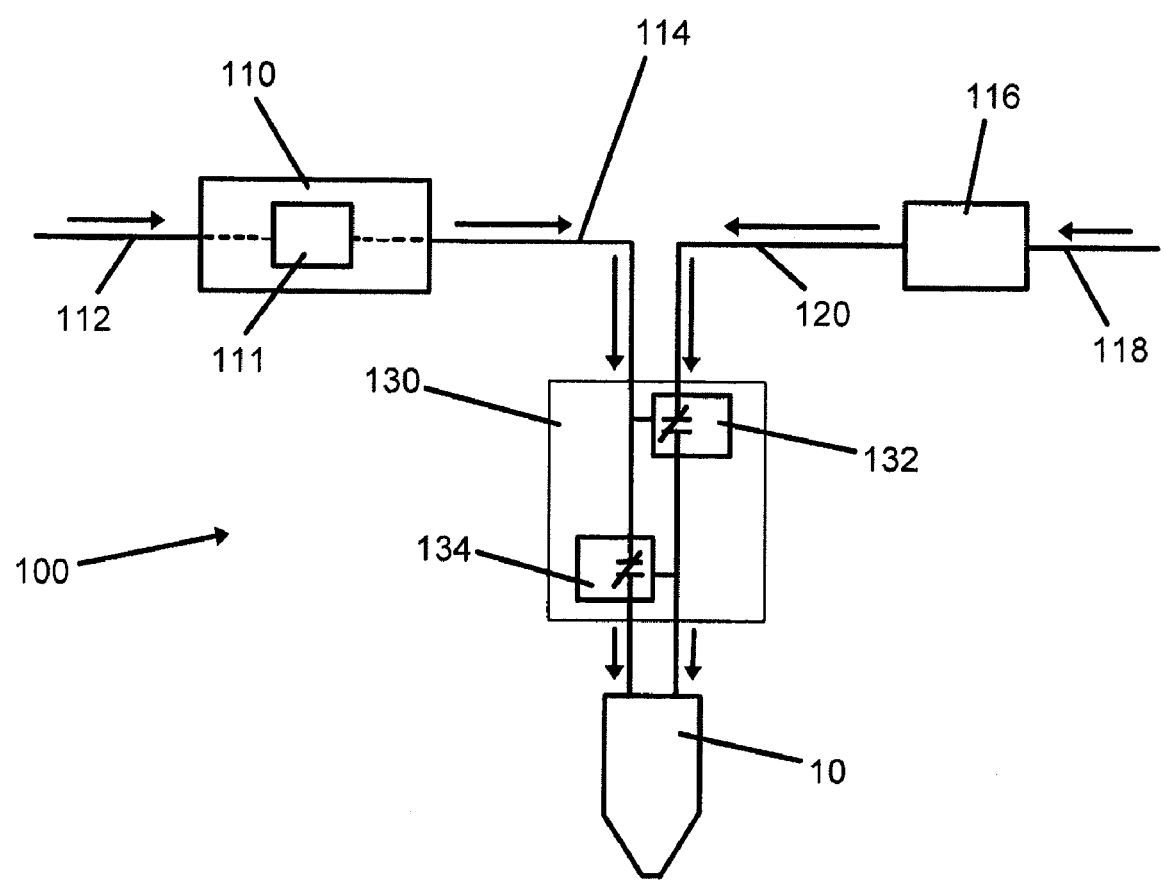

| | | | |
|---|---|---|---|
| 6,232,575 B1 * | 5/2001 | Oakley et al. | 219/121.55 |
| 7,087,856 B2 | 8/2006 | Eldridge | |
| 7,105,770 B2 | 9/2006 | Griffin et al. | |
| 7,598,473 B2 | 10/2009 | Cook et al. | |
| 8,129,652 B2 * | 3/2012 | Hampton | 219/74 |
| 2003/0213783 A1 | 11/2003 | Kinerson et al. | |
| 2005/0045600 A1 | 3/2005 | Tatham | |
| 2006/0163216 A1 | 7/2006 | Brandt et al. | |
| 2008/0006614 A1 | 1/2008 | Brandt et al. | |
| 2008/0217305 A1 | 9/2008 | Sanders | |
| 2009/0057276 A1 | 3/2009 | Hussary et al. | |
| 2010/0258534 A1 | 10/2010 | Hughes | |

FOREIGN PATENT DOCUMENTS

| | | |
|---|---|---|
| EP | 1 599 075 A2 | 11/2005 |
| WO | WO 99/04925 | 2/1999 |
| WO | WO 2012/021236 A1 | 2/2012 |

OTHER PUBLICATIONS

International Search Report and Written Opinion for International Application No. PCT/US2011/043495, mailed Dec. 8, 2011.

* cited by examiner

SYSTEM AND METHOD FOR SUPPLYING FLUIDS TO A PLASMA ARC TORCH

CROSS-REFERENCE TO RELATED APPLICATION

The present application is a continuation-in-part of application Ser. No. 12/852,772 filed on Aug. 9, 2010, currently pending, the entire disclosure of which is incorporated herein by reference.

BACKGROUND OF THE INVENTION

The present disclosure relates generally to plasma arc torches, and more particularly to a system and method for supplying fluids to a plasma arc torch.

BRIEF SUMMARY OF THE DISCLOSURE

The present disclosure describes a system and method for supplying fluids to a plasma arc torch.

In some embodiments the system comprises a valve assembly comprising a pressure-actuated valve that shuts off supply of a fluid to the torch when the valve is closed and allows the fluid to be supplied to the torch when the valve is open. The valve is structured and arranged to be opened by pressure of another fluid being supplied to the torch and to be closed when the other fluid is not being supplied to the torch. The method includes the step of supplying the other fluid so as to open the valve and allow the first fluid to flow to the torch.

In other embodiments, the valve assembly includes a further pressure-actuated valve. Thus, each fluid is supplied to the torch via its respective pressure-actuated valve, and each valve is opened by pressure of the other fluid. Accordingly, it is not possible for only one of the two fluids to be supplied to the torch. This avoids the wasting of gas, which could otherwise occur during a fault condition of the torch.

BRIEF DESCRIPTION OF THE SEVERAL VIEWS OF THE DRAWING(S)

Figure 2:
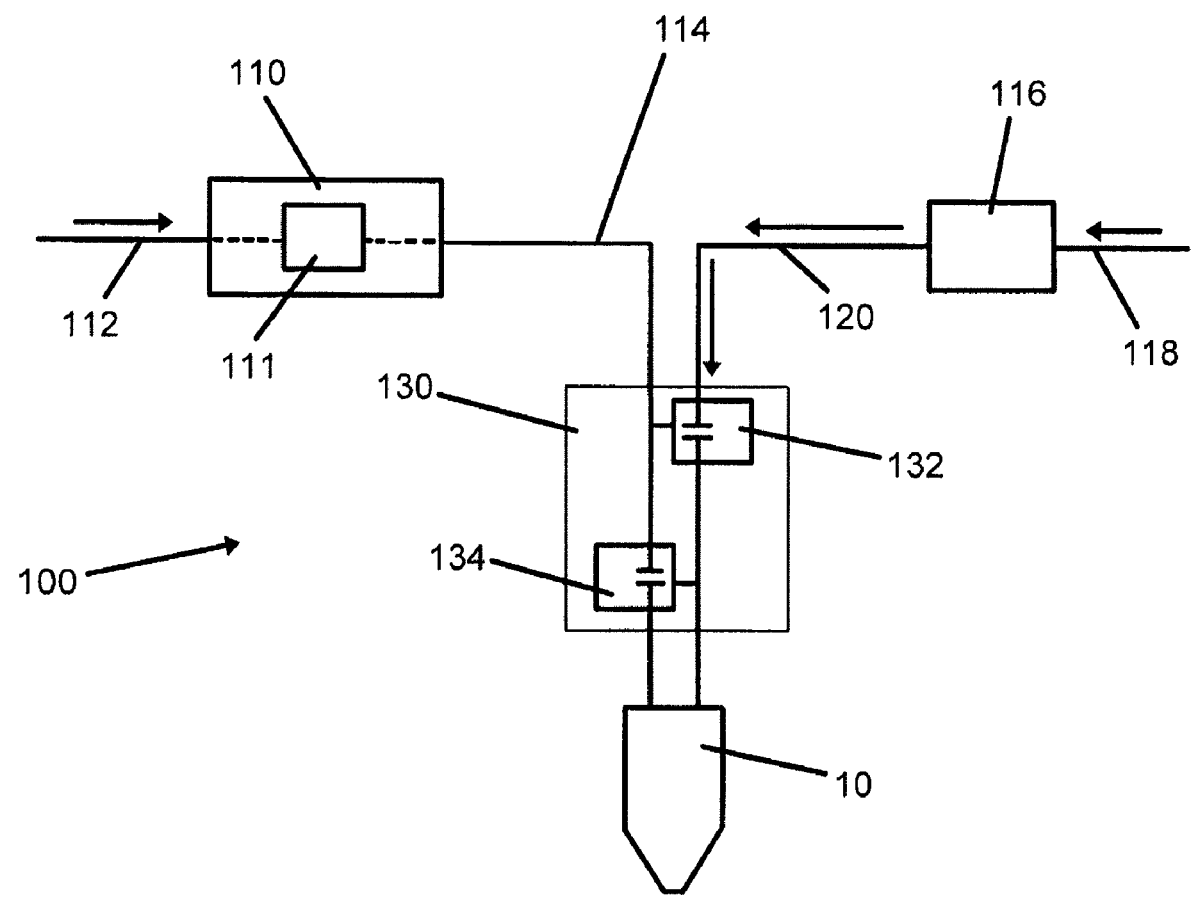
Figure 3:
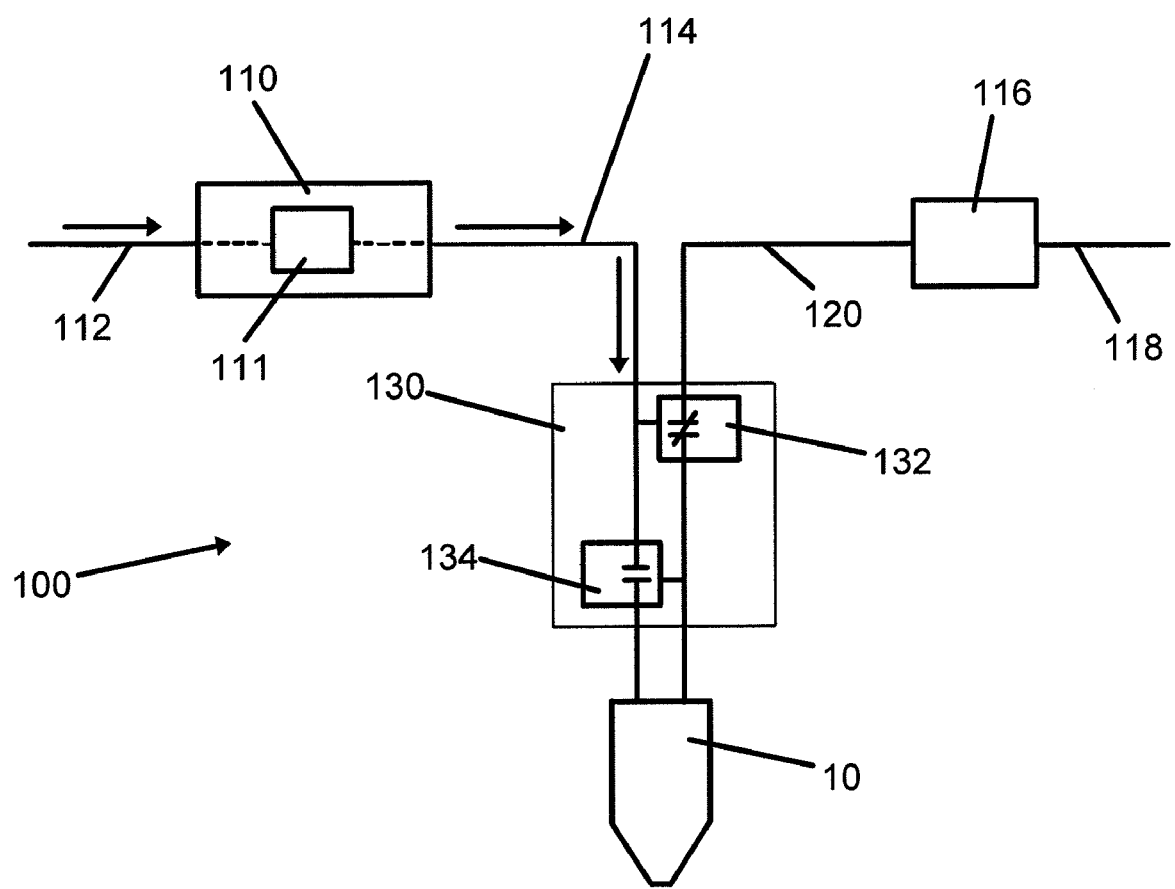

Having thus described the disclosure in general terms, reference will now be made to the accompanying drawings, which are not necessarily drawn to scale, and wherein:

FIG. 1 is a diagrammatic depiction of a plasma arc torch and associated system for supplying plasma gas and second fluid to the torch, in accordance with one embodiment described herein, where both fluids are being supplied to the valve assembly and, therefore, to the torch;

FIG. 2 is similar to FIG. 1, but depicts a condition in which the power supply is not supplying fluid to the valve assembly, and therefore even though the flow regulator is supplying the other fluid to the valve assembly, neither fluid is supplied to the torch; and FIG. 3 is similar to FIG. 1, but depicts a condition in which the flow regulator is not supplying fluid to the valve assembly, and therefore even though the power supply is supplying fluid to the valve assembly, neither fluid is supplied to the torch.

DETAILED DESCRIPTION OF THE DRAWINGS

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in the present specification and the appended claims, the term "pressure-actuated valve" is intended to encompass any valve that is actuated to change states (open to closed, or closed to open) either via a mechanical pressure-sensing element (e.g., a piston operated upon by fluid pressure) that physically moves a valve element, or via a pressure sensor that senses pressure of a fluid and communicates with a suitable actuator (e.g., a solenoid or the like) that moves the valve element based on the sensed pressure.

In FIGS. 1 through 3, flow of a fluid is indicated by an arrow adjacent to the line carrying the fluid, and absence of an arrow indicates absence of fluid in that line. Additionally, a diagonal slash ("/") through a valve indicates the valve is open, and absence of the slash indicates the valve is closed.

Some users of plasma arc torches possess power supplies that have only a single-gas capability. Such power supplies are adequate for use with a conventional single-gas type torch, but would not be able to supply both plasma gas and another fluid (e.g., shield gas) to a torch. However, such single-gas power supplies can be used with the fluid supply system 100 as shown in FIG. 1. The system 100 includes a single-gas power supply 110 that includes a suitable gas flow regulator 111 along with components (not shown) for regulating the electrical power supplied to the torch 10. A fluid (which can be either a plasma gas or a fluid such as a shield gas) is supplied via a line 112 to an inlet of the power supply 110, through the flow regulator 111, and is discharged from an outlet of the power supply as a regulated stream through a supply line 114 connected to the outlet.

The system includes a separate flow regulator 116 for regulating the flow of another fluid, which enters the regulator 116 via a line 118 and exits as a regulated stream through a supply line 120.

The system further includes a valve assembly 130 coupled between the torch 10 and the supply lines 114, 120. The valve assembly has an inlet and an outlet for fluid, and a first pressure-actuated valve 132 interposed between the inlet and the outlet. The inlet is connected to the supply line 120. The valve 132 shuts off supply of the fluid to the torch when the valve is closed and allows the fluid to be supplied to the torch when the valve is open. The valve 132 is arranged to be acted upon by pressure of the fluid carried in the other supply line 114, such that it is opened by pressure of the fluid in the line 114 and is closed when the pressure in the line 114 is below a threshold level. In other words, fluid carried in the supply line 114 is tapped off and supplied to the valve 132 to serve in opening the valve 132 whenever the fluid in the line 114 is being supplied at a sufficient pressure to open the valve. In this manner, the fluid carried in the supply line 120 will be supplied to the torch only when the other fluid carried in the supply line 114 is being supplied to the torch by the power supply 110.

The valve assembly 130 also includes a second inlet and second outlet, and a second pressure-actuated valve 134 therebetween and located downstream of the first pressure-actuated valve 132. The second inlet is connected to the supply line 114. The second pressure-actuated valve 134 is arranged to be acted upon by pressure of the fluid carried in the supply line 120, such that it is opened by pressure of the fluid in the line 120 and is closed when the pressure in the line 120 is below a threshold level. In this manner, the fluid carried in the supply line 114 will be supplied to the torch only when the other fluid carried in the supply line 120 is being supplied to the torch.

The system depicted in FIG. 1 can be used with plasma gas supplied through the supply line 114 and secondary gas (e.g., shield gas) supplied through the supply line 118. However, the system works in essentially the same way if the gas supplies are switched so that secondary gas (e.g., shield gas) is supplied through the supply line 114 and plasma gas is supplied through the supply line 118. In either case, the system will work with the "parts in place" systems commonly employed in plasma arc torches, such as described in U.S. Pat. No. 7,087,856 assigned to the assignee of the present application and hereby incorporated herein by reference. The typical "parts in place" system such as that described in the '856 patent prevents the torch from operating unless certain conditions are met. For example, in a torch that employs both a plasma gas and a separate shield gas, those conditions generally include at least (1) the electrode and nozzle are properly installed in the torch (as opposed to one or both being absent), and (2) shield gas is flowing through the torch. If the check for either or both of these conditions fails (i.e., if one or more fault conditions are detected), then the torch will not operate.

The system 100 complements and improves upon torch systems having such a "parts in place" system, by preventing any gas from flowing for an extended period of time in any of the various possible system conditions. The table below illustrates all of the possible combinations of gas supply and torch assembly conditions, and the resulting fault conditions, if any, for a blow-back type of plasma arc torch such as described in co-pending application Ser. No. 12/852,772 filed on Aug. 9, 2010, the entire disclosure of which is incorporated herein by reference:

| Torch properly assembled? | Shield gas pressure at inlet of valve assembly? | Plasma gas pressure at inlet of valve assembly? | Resulting Operating Condition | Gas flowing? |
| --- | --- | --- | --- | --- |
| Yes | Yes | Yes | Normal operating condition. Both valves open and both gases flowing (FIG. 1). | Yes |
| No | Yes | Yes | Torch will not start because electrode will not be in contact with nozzle, resulting in a machine fault. Upon detection of the fault, the power supply will cut off the supply of one gas, and hence the valve assembly will prevent flow of the other gas. | Only briefly during the parts check sequence. |
| Yes or No | No | Yes | Neither valve will open (FIG. 2). The parts check will fail and the machine will indicate a fault. | No |
| Yes or No | Yes | No | Plasma gas valve will open, but shield gas valve will not open because of lack of plasma gas (FIG. 3). Because no shield gas is present, the machine will indicate a fault. | No |
| Yes or No | No | No | Neither valve will open. The parts check will fail and the machine will indicate a fault. | No |

From the above table, it can be seen that there is no possible system state (except the normal operating state) in which any gas will flow for an extended period of time. In this way, the present invention prevents the wasting of gas, which can be highly beneficial when costly gases such as oxygen, nitrogen, H35, or the like, are employed.

The valve assembly 100 is illustrated as having two pressure-actuated valves, but in some applications a valve assembly having a single pressure-actuated valve can be useful. For example, the second pressure-actuated valve 134 can be omitted. In this case, the first fluid carried in the supply line 120 will be supplied to the torch only when the second fluid in the supply line 114 is also being supplied to the torch such that the valve 132 is opened. If the second fluid in the line 114 is absent, then the valve 132 will be closed such that no fluids are supplied to the torch. One drawback to the single-valve arrangement, however, is that when it is used with a torch having a "parts in place" check system that checks for the presence of gas carried in the line 114, if for some reason gas were being supplied through the line 114 but not through the line 120, the check system would not "know" that one of the gases is absent. This problem is solved by the addition of the second pressure-actuated valve 134, because as previously explained, it is not possible for one gas to be supplied while the other is not.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for supplying fluids to a plasma arc torch, comprising:
   a single-gas power supply operable for regulating supply of electrical power to the plasma arc torch and for regulating supply of a first fluid to the plasma arc torch;
   a flow regulator separate from the single-gas power supply and operable for regulating supply of a second fluid to the plasma arc torch; and
   a valve assembly comprising:
      a first pressure-actuated valve disposed between the flow regulator and the plasma arc torch, the pressure-actuated valve shutting off supply of the second fluid to the torch when the first pressure-actuated valve is closed and allowing the second fluid to be supplied to the torch when the first pressure-actuated valve is open, wherein the first pressure-actuated valve is structured and arranged to be opened by pressure of the first fluid being supplied to the torch and to be closed when the first fluid is not being supplied to the torch.

2. The system of claim 1, the valve assembly further comprising:

a second pressure-actuated valve disposed between the single-gas power supply and the plasma arc torch, the second pressure-actuated valve shutting off supply of the first fluid to the torch when the second pressure-actuated valve is closed and allowing the first fluid to be supplied to the torch when the second pressure-actuated valve is open, wherein the second pressure-actuated valve is structured and arranged to be opened by pressure of the second fluid being supplied to the torch and to be closed when the second fluid is not being supplied to the torch.

3. A method for supplying fluids to a plasma arc torch, comprising the steps of:

supplying a first fluid to the torch via a pressure-actuated valve;

supplying a second fluid to the torch; and providing the pressure-actuated valve to be acted upon by pressure of the second fluid being supplied to the torch so as to open the pressure-actuated valve, the pressure-actuated valve being closed when the second fluid is not being supplied to the torch.

4. The method of claim 3, further comprising the steps of:

supplying the second fluid to the torch via a further pressure-actuated valve; and providing the further pressure-actuated valve to be acted upon by pressure of the first fluid being supplied to the torch so as to open the further pressure-actuated valve, the further pressure-actuated valve being closed when the first fluid is not being supplied to the torch.

5. A valve assembly for supplying fluids to a plasma arc torch, comprising:

a first inlet and a first outlet and a first pressure-actuated valve disposed therebetween, such that fluid flows from the first inlet to the first outlet via the first pressure-actuated valve;

a second inlet and a second outlet and a second pressure-actuated valve disposed therebetween, such that fluid flows from the second inlet to the second outlet via the second pressure-actuated valve;

the first pressure-actuated valve being arranged to be acted upon by pressure of fluid being supplied through the second pressure-actuated valve such that when the pressure of the fluid being supplied through the second pressure-actuated valve exceeds a threshold level the first pressure-actuated valve opens so as to allow fluid to be supplied through the first pressure-actuated valve; and the second pressure-actuated valve being arranged to be acted upon by pressure of fluid being supplied through the first pressure-actuated valve such that when the pressure of the fluid being supplied through the first pressure-actuated valve exceeds a threshold level the second pressure-actuated valve opens so as to allow fluid to be supplied through the second pressure-actuated valve.

\* \* \* \* \*